(12) United States Patent
Osburn, III et al.

(10) Patent No.: US 7,646,298 B1
(45) Date of Patent: Jan. 12, 2010

(54) METHOD FOR DETECTING CHANGES IN MEASURABLE CONDITIONS

(75) Inventors: Douglas C. Osburn, III, Houston, TX (US); John D. Cannoy, Long Beach, MS (US)

(73) Assignee: DJ Inventions, LLC, Houston, TX (US)

( * ) Notice: Subject to any disclaimer, the term of this patent is extended or adjusted under 35 U.S.C. 154(b) by 121 days.

(21) Appl. No.: 11/874,070

(22) Filed: Oct. 17, 2007

Related U.S. Application Data (63) Continuation-in-part of application No. 11/829,051, filed on Jul. 26, 2007, now abandoned, and a continuation-in-part of application No. 11/345,759, filed on Feb. 2, 2006.

(60) Provisional application No. 60/649,795, filed on Feb. 3, 2005.

(51) Int. Cl.
  *G08B 1/08* (2006.01)
  *G08G 1/123* (2006.01)
  *G01S 5/00* (2006.01)
  *G01C 21/00* (2006.01)
  *B60L 3/00* (2006.01)

(52) U.S. Cl. .................. 340/539.26; 340/539.22; 340/992; 342/357.07; 701/207; 701/21

(58) Field of Classification Search ............ 340/539.26; 342/357.07
See application file for complete search history.

(56) References Cited

U.S. PATENT DOCUMENTS

| 5,719,771 | A * | 2/1998 | Buck et al. ............... 455/456.5 |
| 6,658,349 | B2 * | 12/2003 | Cline ........................ 701/207 |
| 7,286,914 | B2 * | 10/2007 | Cerchione et al. ............. 701/21 |
| 2004/0217900 | A1 * | 11/2004 | Martin et al. .......... 342/357.07 |
| 2005/0138120 | A1 * | 6/2005 | Gundersen et al. .......... 709/204 |

* cited by examiner

*Primary Examiner*—Daniel Wu
*Assistant Examiner*—Jack Wang
(74) *Attorney, Agent, or Firm*—Buskop Law Group, PC; Wendy Buskop (57) ABSTRACT

A method for receiving information on measurable conditions using at least one enterprise server and at least one remote terminal unit. The enterprise server is adapted to simultaneously handle multiple types of telemetry and multiple different protocols associated with at least one remote terminal unit on at least one vessel over a network. Selective encryption is used to communicate between the server and the remote terminal unit. The remote terminal unit collects data on measurable conditions, which is stored, streamed to enterprise server, or combinations thereof. When the collected data exceeds a preset limit, an alarm is automatically initiated. During communication, the enterprise server simultaneously on-line configures and reconfigures the remote terminal unit.

19 Claims, 7 Drawing Sheets

METHOD FOR DETECTING CHANGES IN MEASURABLE CONDITIONS

CROSS REFERENCE TO RELATED APPLICATIONS

This application claims priority as a continuation-in-part application to co-pending U.S. Non-Provisional application Ser. No. 11/345,759 filed on Feb. 2, 2006, which claims priority to U.S. Provisional Application Ser. No. 60/649,795 filed on Feb. 3, 2005. This Application also claims priority as a continuation-in-part application to co-pending U.S. Non-Provisional application Ser. No. 11/829,051 filed on Jul. 26, 2007. A related but patentable distinct application, entitled "System for Detecting Changes in Preselected Measurable Conditions" is being filed concurrently with this Application.

FIELD

The present embodiments relate to a secure method for detecting changes in measurable conditions using a secure system with remote terminal units and an enterprise server.

BACKGROUND

When managing large deployments of vessels, and when trying to monitor large geographic areas, there is a need to accurately and securely collect data on measurable conditions.

There further exists a need for a method for detecting changes in a voluminous amount of data collected from multiple points using a single system.

When there are detected changes in the measurable information outside of accepted parameters, it is important to have a method for initiating an alarm that will alert appropriate persons regarding the changes in the measurable information.

A need exists for a method for transmitting information related to measurable conditions that is secure and allows data to be collected using multiple data points.

The present embodiments meet these needs.

BRIEF DESCRIPTION OF THE DRAWINGS

The detailed description will be better understood in conjunction with the accompanying drawings as follows:

FIG. 1B is a continuation of the embodiment depicted in FIG. 1a.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The embodiments of the invention generally relate to a method for detecting changes in measurable conditions.

Measurable conditions include changes in pressure, changes in location of a vessel, changes in location of a vessel relative to a predefined position, changes in temperature, changes in location of a vessel relative to an identified secondary location, changes in altitude, and combinations thereof.

The embodiments of the invention generally include using one or more enterprise servers adapted individually and simultaneously handle multiple types of telemetry and different protocols associated with at least one remote terminal unit on at least one vessel.

The method contemplates that the enterprise server can verify the identity of one or more remote terminal units. Multiple remote terminal units can be on a single vessel, a plurality of vessels can each have at least one remote terminal unit, or any combination thereof. The remote terminal unit communicates with one or more enterprise servers in communication with a network.

The method contemplates that the remote terminal units can each authenticate the one or more enterprise servers, ensuring that each remote terminal unit is property communicating with the correct enterprise server, and that each remote terminal unit is authorized to communicate with its respective enterprise server.

Additionally, the method contemplates the use of encryption to encode and make secure the communications from one or more of the remote terminal units to the enterprise server, and from the enterprise server to one or more of the remote terminal units. It is also contemplated that encryption can be used between remote terminal units, such as one or more remote terminal units on a small local network that communicate with a single remote terminal unit, that in turn communicates with an enterprise server.

In this method it is contemplated that data relating to one or more measurable conditions can be collected and stored by the one or more remote terminal units. The data can be analog upon collection, and can be digitized prior to storing or after storing.

In an embodiment, it is contemplated that data which is collected as digital data can be streamed directly from a remote terminal unit to the enterprise server, without storing.

In a contemplated embodiment selective encryption can be used, either by the one or more enterprise servers or by the one or more remote terminal units or by both during transmission.

Once the one or more enterprise servers receive the digital data from the one or more remote terminal units the servers compare the digital data with preset limits of the data relating to the measurable conditions. The enterprise server can automatically initiate an alarm to a user or to another device, when the measurable data exceeds pre-set limits.

In an embodiment of the invention, the one or more enterprise servers can initiate a control command when the detected changes are outside a preset limit, and simultaneously configure and reconfigure the at least one remote terminal unit. Selective encryption can be performed during communication between the enterprise server and the at least one remote terminal unit. The communications can include configuration, reconfiguration, or combination of reconfiguration and configuration command, in addition to requests for data and data transfer.

The embodiments of the invention allow for a person to monitor measurable parameters of a large fleet of vessels, or multiple vessels located over a large geographic area.

For example, a military commander could use the embodiments of the invention to identify when a squadron of tanks reach a specific geographic point, without the need to manually continuously monitor the tanks using satellite imaging.

Additional, the military commander could be notified when the tanks are in a prohibited area. Of course, the military commander could also receive notification when other measurable parameters are outside a preset limit, for example an alarm could be initiated when a tank's fuel is below 50%, or when a single tank has moved more than 5 miles from a location.

The ability to receive notification when measurable parameters exceed preset limits enable people in charge of the movements of a large group of vessels or the movements of a vessel within a large geographic location to take immediate action when measurable parameters for one of the vessels exceeds a preset limit. This immediate action can prevent death, or catastrophic failure associated with the deployment of or the monitoring of a large fleet of vessels.

For example, an embodiment of the system would allow a flight controller to monitor a plane with a remote terminal unit installed on the plane. A preset limit could be set. For example, the measurable information could be distance deviation from a flight plan, or an altitude deviation from a flight plan. An acceptable limit would be set. For example, it may be acceptable for a plane to deviate 3 miles from the designated flight path, in this case the preset limit would be 3 miles from a designated path.

If the plane deviated from the flight path by more than 3 miles an alarm would be initiated alerting the flight controllers to the deviation so that the flight controllers could take immediate action to locate the plane.

The impact the embodiments of the method would have on fighting terrorism, fighting wars, shipping material, factory logistics, and even in the monitoring of motorists with suspended licenses would be exceptional.

The embodiments of this method could save hundreds of lives a day and help to prevent damage to the environment.

For example, snowmobiles could be equipped with the remote terminal unit, before the snowmobile enters a National Park, such as Yellowstone. The remote terminal unit would allow Park Rangers to monitor the speed of the snowmobiles and to ensure that the snowmobiles were on approved snow trials.

The Park Rangers would be able to prevent snowmobilers from harassing animals and going off trail destroying the delicate eco-system of the National Parks, while allowing the snowmobilers to enjoy the beauty of the National Parks.

The financial benefit is apparent, since the Park Rangers would not have to be continuously watching the snowmobilers, but instead would receive an alert when snowmobilers were a certain distance off of an approved trail.

The term "online" for the purposes of this invention means that the control and/or monitoring functions of the remote terminal unit can be changed without taking the system down or "offline". Online means the control or monitoring functions from the at least one enterprise server to the at least one remote terminal unit can continue, and even other functions of the remote terminal unit or enterprise server can continue while configuration and reconfiguration occurs.

Some but not all of an remote terminal unit's function can be configured while some remote terminals units continue to operate. All of the functions of any remote terminal unit can be configured while a second remote terminal unit is allowed to operate without being configured or reconfigured. For example, a remote terminal unit in the non-secure mode performing a control in a SCADA system can be made secure while it is still performing its control functions.

The remote terminal unit can be a sensor with a transmitter, a radio frequency identification tag with an activator and a receiver, a bar code with a bar code reader, a status switch, a global positioning system receiver and transmitter, a portable data acquisition system, an acquisition recording device, a vibration monitoring device, a video monitoring device and combinations thereof.

The embodiments of the method will be better understood with reference to the Figures, and at the same time the novel and unique results achievable with the method will be understood.

Figure 1A:
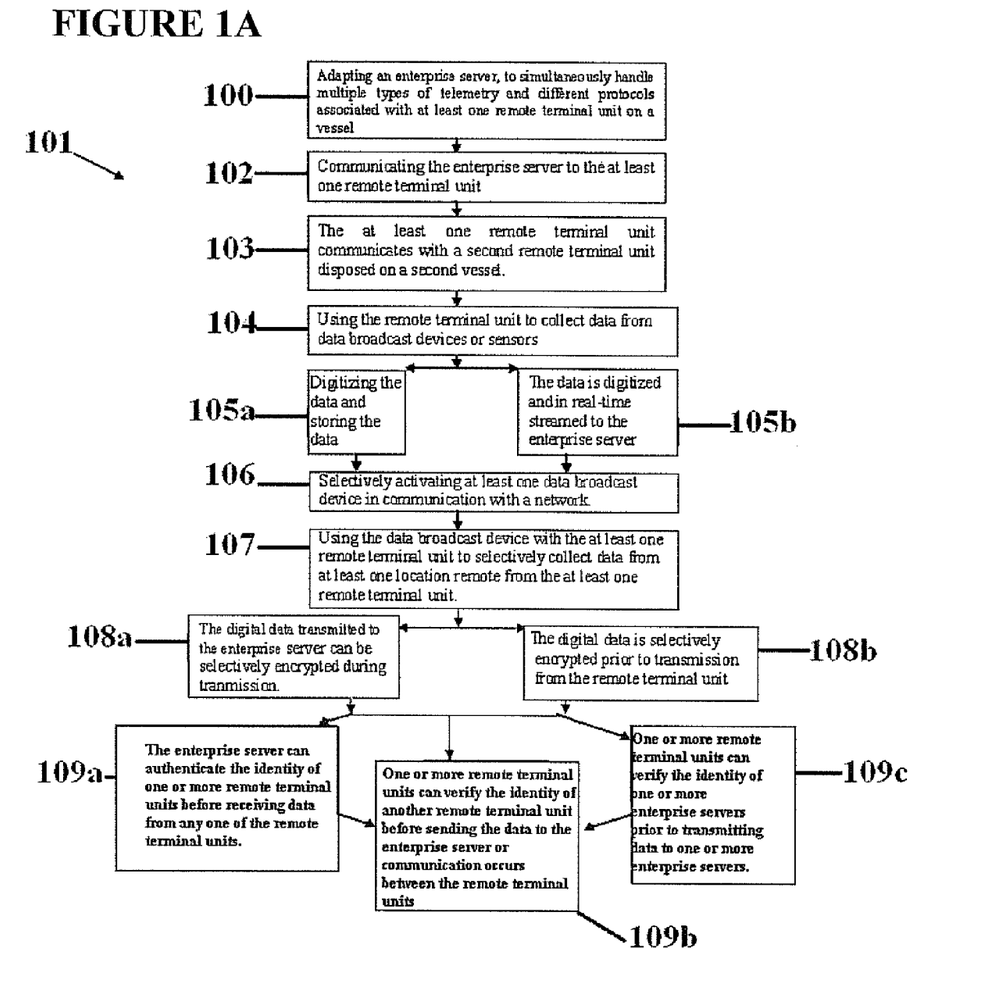
FIG. 1A depicts an embodiment of the method.
Figure 1B:
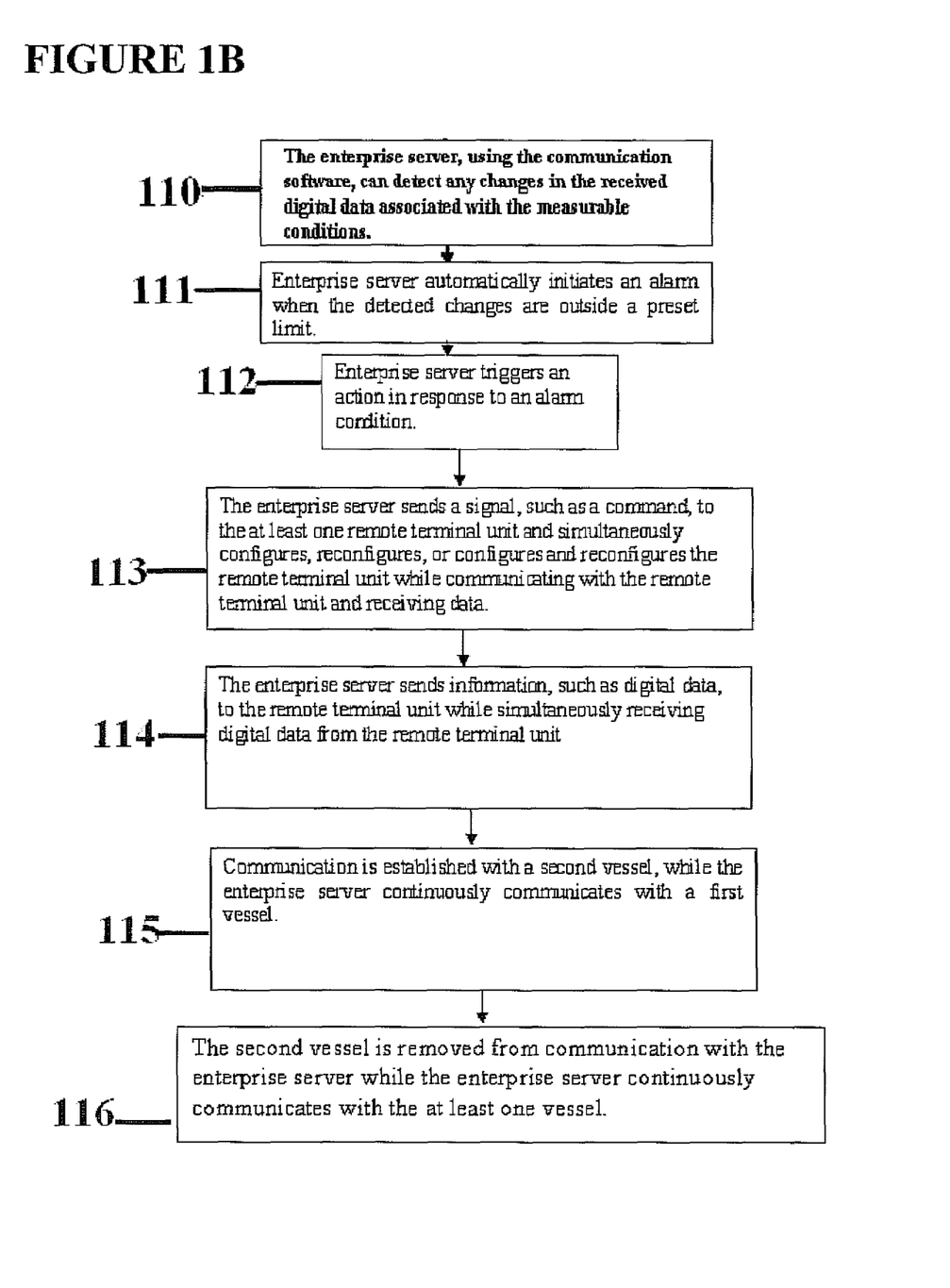

Referring now to FIGS. 1A and 1B. An embodiment of the method for detecting changes in measurable conditions 101 is depicted. The measurable conditions can include temperature, such as the water temperature surrounding a vessel; pressure, such as the transient pressure change that occurs in the passing of a Tsunami; decibels, such as a change in sound level when a airplane brakes the sound barrier; position, such as a longitude and latitude provided by a Global Positioning Satellite (GPS); distance from a predefined position, such as deviation from a preplanned course of travel; available fuel, such as if a vessel is about to run out fuel; velocity, such as a maximum velocity measured using a governor; acceleration, such as a measurement from an accelerometer to ensure that a certain G-force is not exceeded; altitude, such as a instrument to monitor the elevation of a meteorology balloon; or combinations thereof. For example, the measurable condition could be the distance a vessel is from a warehouse.

The enterprise server can include one or more power supplies, which can include alternating current sources, direct current sources, renewable power sources, rechargeable power sources, replaceable power sources, and combinations thereof.

The enterprise server can further include one or more telemetry interfaces, such as a plain old telephone modem, radio, satellite, or Ethernet interface.

The enterprise server can further include one or more processors in communication with data storage. The server data storage can include protocol modules, such as a BSAP, a MODBUS, or similar protocol modules, connection modules, such as a serial module, a dial-up module, or a TCP/IP module, and a server configuration database, such as an Oracle or Microsoft Access database, for restoring online configurations of the enterprise server when the server is reset.

The method for detecting changes in measurable conditions 101 includes step 100, which includes adapting an enterprise server, to simultaneously handle multiple types of telemetry and different protocols associated with at least one remote terminal unit on a vessel.

The vessel can be a semi-submersible platform, such as a GlobalSantaFe Glomar Celtic Sea; a submersible vessel, a floating vessel, such as a boat; an armored vehicle, such as a tank or armored car; a moving vehicle, such as a truck in transport or an airplane; a deep draft cassion vessel; a ship; a truck; an automobile; a train; a plane; an individual, such as a mail man, a solider, or a person being monitored by the state for a criminal offense; a container on a vessel, such as a container containing manufactured parts, nuclear waste, or confidential material; a fuel tank, such as a fuel tank on a tank, a fuel tank on a car, or a fuel tank on a truck; a piece of equipment, such as military equipment, manufacturing equipment, or power generation equipment, and combinations thereof.

Step 102 includes communicating the enterprise server to the at least one remote terminal unit, using selective encryption between the enterprise server and the remote terminal unit. An example of selective encryption is using elliptical curve cryptography to encrypt a portion of data transmitted or to encrypt all of the data transmitted depending on the data transmitted.

The communicating can be accomplished using communication software. The remote terminal unit can directly communicates with the enterprise server using one of the enterprise servers telemetry interface or a combination of the enterprise server's telemetry interfaces.

In the depicted embodiment, step 103, the at least one remote terminal unit communicates with a second remote terminal unit disposed on a second vessel. However, step 103 is optional and other embodiments of the method can be performed without step 103. During step 103 the at least one remote terminal unit and the second remote terminal unit are simultaneously communicating directly with the enterprise server.

In a contemplated embodiment of the method, at least one vessel is under water and the second vessel is on the surface of the water and communication between the remote terminal units and the enterprise serve can be performed.

In another embodiment the at least one vessel is under water and the second vessel is on land and communication between the remote terminal units and the enterprise serve can be performed.

In still another embodiment the at least one vessel is underwater and the second vessel is in the air and communication between the remote terminal units and the enterprise serve can be performed. Other variations in the locations of the vessels are possible.

The communication software is adapted to simultaneously handle multiple types of telemetry and protocols, which can include differing languages, differing types of data broadcast devices or remote terminal units, and differing manufacturers of system components.

The next step in the method, step 104, is using the remote terminal unit to collect data from data broadcast devices or sensors.

After data on measurable conditions is collected, the method can continue by either performing step 105a, which includes digitizing the data and storing the data or performing alternative step 105b. In step 105b data on measurable conditions is collected using at least one remote terminal unit, then the data is digitized and in real-time streamed to the enterprise server.

The data can be digitized using an analog-to-digital converter. After the data is digitized the digital data is stored in the remote terminal unit. For example, the data could be stored in a memory area of the remote terminal unit.

The depicted embodiment of the method includes step 106, selectively activating at least one data broadcast device in communication with a network.

After step 106, step 107 is performed, which involves using the data broadcast device with the at least one remote terminal unit to selectively collect data from at least one location remote from the at least one remote terminal unit.

In step 108a, the digital data transmitted to the enterprise server can be selectively encrypted during transmission. The electronic encryption can be performed using an intelligent electronic cryptographic module. The intelligent electronic cryptographic module is better described in FIG. 3.

For example, the remote terminal unit would use the communication software to transmit the digital data to the enterprise server, and during the transmission the digital data would pass through the intelligent electronic cryptographic module, and could be selectively encrypted if the digital data is confidential or it could be sent without encryption if it is not confidential or sensitive data.

Step 108b can be performed in lieu of 108a, or step 108b can be performed simultaneously with step 108a. In step 108b the digital data is selectively encrypted prior to transmission from the remote terminal unit.

For example the remote terminal unit could use the software to encrypt data, after encryption the remote terminal unit could transmit the encrypted data to the enterprise server. Alternatively, the remote terminal unit could send data to an intelligent electronic cryptographic module for encryption prior to sending the data to the enterprise sever.

In step 109a, the enterprise server can authenticate the identity of one or more remote terminal units before receiving data from any one of the remote terminal units.

In step 109b one or more remote terminal units can verify the identity of another remote terminal unit before sending the data to the enterprise server or communication occurs between the remote terminal units.

In step 109c one or more remote terminal units can verify the identity of one or more enterprise servers prior to transmitting data to one or more enterprise servers.

In step 110 the enterprise server, using the communication software, can detect any changes in the received digital data associated with the measurable conditions from the remote terminal units.

The enterprise server in step 111 automatically initiates an alarm when the detected changes are outside a preset limit. The comparison can include operational statistics, proportional statistics, extrapolation, calculation of a deferential equation, or other forms of mathematical operations on data. The enterprise server can automatically initiate the alarm using the communication software.

In step 112 the enterprise server triggers an action in response to an alarm condition. For example, the enterprise server could activate an e-mail, a page, and a text-message to officials in charge of monitoring the measurable condition. The enterprise server can provide a command to a device on another network or a device on the network with the one or more remote terminal units.

In step 113, the enterprise server sends a signal, such as a command, to the at least one remote terminal unit and simultaneously configures, reconfigures, or configures and reconfigures the remote terminal unit while communicating with the remote terminal unit and receiving data. It is contemplated that the reconfiguring can be performed on a periodic basis. For example the remote terminal unit can be reconfigured every 25 days.

The enterprise server can selectively encrypt the communication between the enterprise server and the remote terminal unit, such as, a portion of the digital data can be encrypted, while a second portion of the data is left unencrypted. The enterprise server and the remote terminal units are capable of receiving data that is encrypted and data that is not encrypted.

In step 114 the enterprise server sends information, such as digital data, to the remote terminal unit while simultaneously receiving digital data from the remote terminal unit.

In step 115, communication is established with a second vessel, while the enterprise server continuously communicates with a first vessel.

In step 116 of the depicted method the second vessel is removed from communication with the enterprise server while the enterprise server continuously communicates with the at least one vessel.

Figure 2:
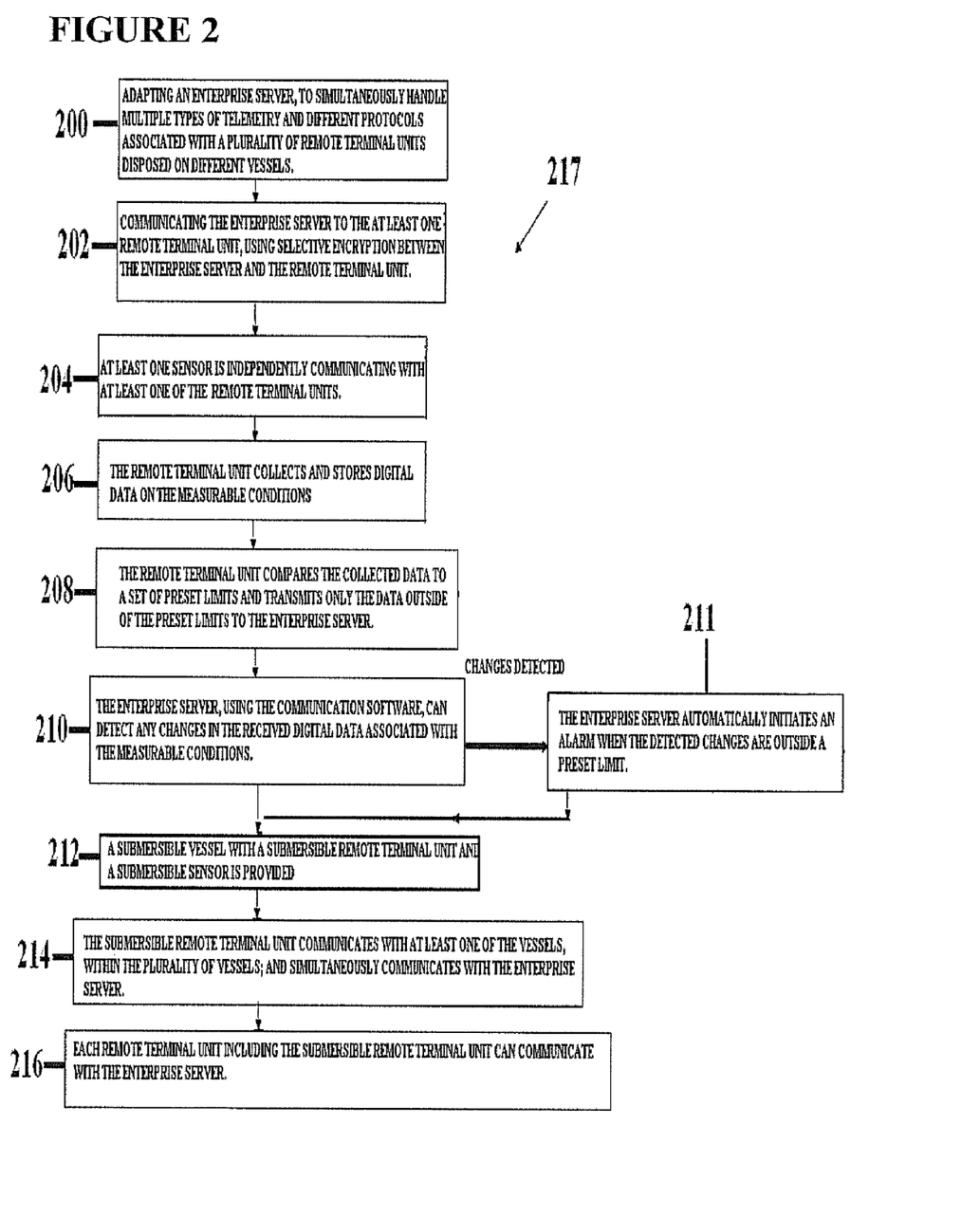
FIG. 2 depicts a second embodiment of the method.

FIG. 2 depicts another possible embodiment of the method. The additional embodiment of the method 217 includes step 200, which includes adapting an enterprise server, to simultaneously handle multiple types of telemetry and different protocols associated with a plurality of remote terminal units disposed on different vessels.

The method 217 also includes Step 202, communicating the enterprise server to the at least one remote terminal unit, using selective encryption between the enterprise server and the remote terminal unit.

In step 204 at least one sensor is independently communicating with at least one of the remote terminal units. For example, a pressure sensor, for detecting the pressure in a brake line can be communicated to a first remote terminal unit on a truck headed to a warehouse to retrieve a package; and a second sensor, for measuring the temperature of the package, can be communicated to a second remote terminal unit placed on the package. The communication between the remote terminal unit and the sensor can be through hard wiring, radio transmission, wireless transmission, Blue Tooth™ technology, or combinations thereof.

The next step in the current method is step 206, the remote terminal unit collects and stores digital data on the measurable conditions.

After the digital data is collected and stored, step 208 is performed, wherein the remote terminal unit compares the collected data to a set of preset limits and transmits only the data outside of the preset limits to the enterprise server. During the transmission in step 208 the digital data can be selectively encrypted.

In step 210 the enterprise server, using the communication software, can detect any changes in the received digital data associated with the measurable conditions. If the enterprise server detects changes then in step 211 the enterprise server automatically initiates an alarm when the detected changes are outside a preset limit.

In step 212, of the second method, a submersible vessel with a submersible remote terminal unit and a submersible sensor is provided.

In step 214, the submersible remote terminal unit communicates with at least one of the vessels, within the plurality of vessels; and simultaneously communicates with the enterprise server. For example the submersible vessel could be a unmanned underwater vehicle with a sensor for measuring decibels within the water of a harbor to detect the movement of a watercraft through the harbor, and the remote terminal unit could be communicating with a remote terminal unit on a boat patrolling the harbor and at the same time the remote terminal unit can be communicating with the enterprise server.

In this method, if the boat requires information from the submersible remote terminal unit the boat can receive the digital data, and at the same time a patrol head quarters can be alerted when the decibels exceed a predetermined level.

In step 216 each remote terminal unit including the submersible remote terminal unit can communicate with the enterprise server.

Figure 3:
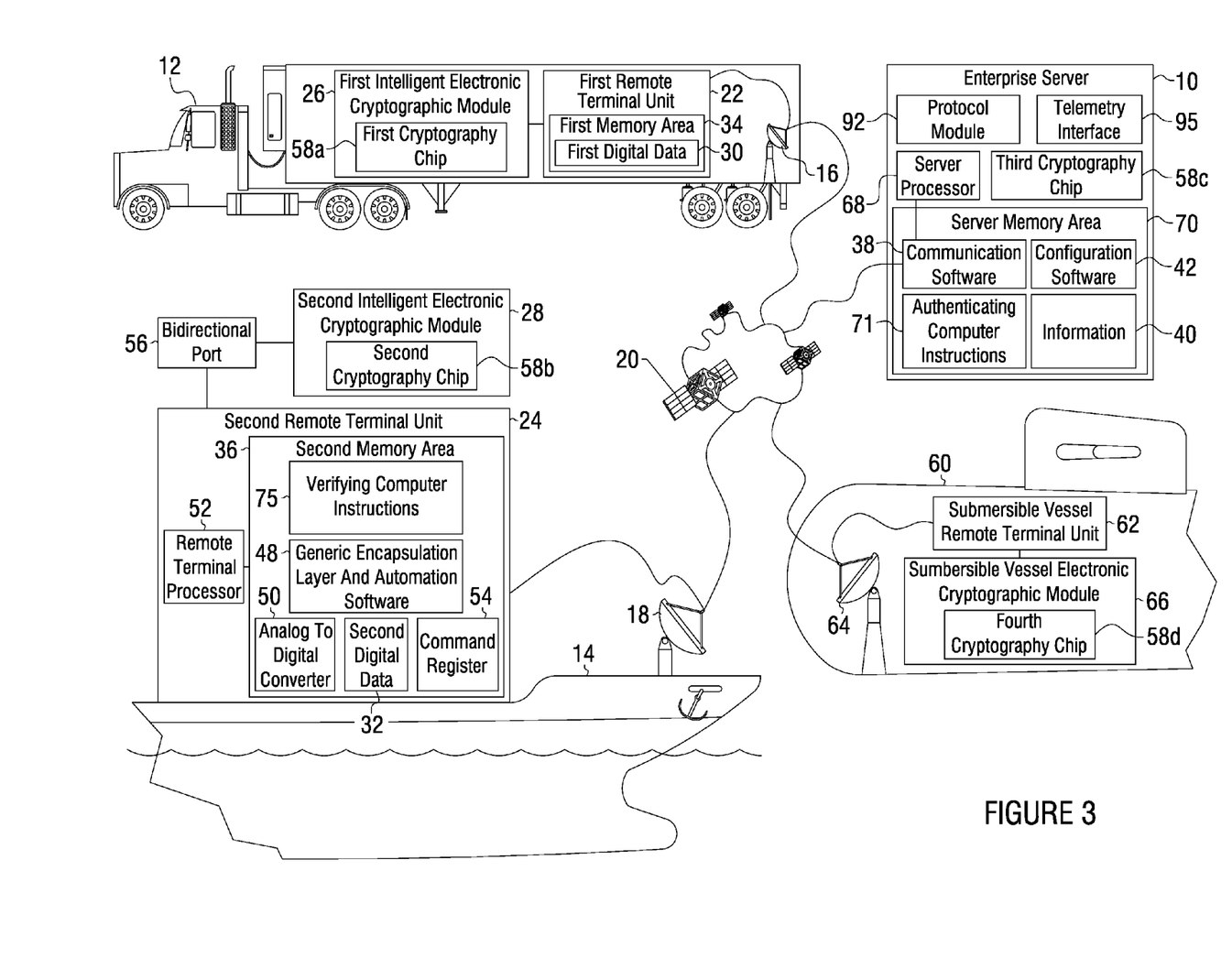
FIG. 3 depicts a diagram showing the components of an embodiment of a system usable with an embodiment of the method.

Referring now to FIG. 3, a diagram depicting the components of an embodiment of the present system is shown.

Enterprise server 10 is shown having a server processor 68 in communication with server memory area 70. While server memory area 70 is depicted within enterprise server 10, server memory area 70 could also be located remote from enterprise server 10 and in communication with enterprise server 10 using one or more networks, which can include use of network 20. Server memory area 70 could also include one or more removable data storage media.

The network 20 can be a local area network, a wide area network, a cellular network, a radio network, a plain old telephone network, a satellite network, a infrared network, a fiber optic network, a world wide network, such as the Internet, and combinations thereof.

Enterprise server 10 is also shown having a third cryptography chip 58c for selectively encrypting commands and requests for information transmitted to a first remote terminal unit 22, a second remote terminal unit 24, or submersible vessel remote terminal unit 62, and decrypting encrypted responses, information, or measurements from any of the remote terminal units. While the third cryptography chip 58c is depicted within enterprise server 10, third cryptography chip 58c could also be remote from enterprise server 10 and accessed using one or more networks, which can include use of network 20. The third cryptography chip 58c can also be contained within a removable data storage device that can communicate with enterprise server 10, such as through a universal serial bus port.

Server memory area 70 is depicted having communication software 38, which communicates with first remote terminal unit 22, second remote terminal unit 24, and submersible vessel remote terminal unit 62, and collects information 40, also shown stored in server memory area 70, relating to changes in preselected conditions within areas monitored by each remote terminal unit.

Server memory area 70 is further shown having configuration software 42, which selectively executes configuration and reconfiguration commands for first remote terminal unit 22, second remote terminal unit 24, and submersible vessel remote terminal unit 62. It is contemplated that the configuration and reconfiguration commands are transmitted using communication software 38. Configuration and reconfiguration commands for first intelligent electronic cryptographic module 26, second intelligent electronic cryptographic module 28, submersible vessel intelligent electronic cryptographic module 66, or combinations thereof can also be transmitted using communication software 38.

While FIG. 3 depicts first vessel 12 as a truck, first vessel 12 can be any type of vehicle, container, piece of equipment, individual, or other object. First vessel 12 is shown having a first data broadcast device 16 which is in communication with a network 20. The network 20 can be a satellite network; a cellular communication network; a secured network, such as a government network, or combinations thereof.

First data broadcast device 16 can include any type of data broadcast device, including radio frequency identification readers and transmitters, global positioning system transmitters, and other similar devices useable to track or determine the location of first vessel 12.

First data broadcast device 16 is shown in communication with a first remote terminal unit 22 disposed on first vessel 12. While first remote terminal unit 22 is depicted on first vessel 12, it is contemplated that first remote terminal unit 22 can be remote from first vessel 12 and in communication with first data broadcast device 16 using one or more networks, which can include use of network 20.

It is further contemplated that first remote terminal unit 22 could be in communication with multiple data broadcast devices within one or multiple vessels.

First remote terminal unit 22 is shown having a first memory area 34. First digital data 30 is shown stored within first memory area 34. First digital data 30 can be any type of data, measurement, information, collected by first remote terminal unit 22 or first data broadcast device 16. While first memory area 34 is depicted within first remote terminal unit 22, first memory area 34 can also be remote from first remote terminal unit 22 and in communication with first remote terminal unit 22 using one or more networks, which can include use of network 20. In an embodiment, first memory area 34 can include one or more removable data storage media.

First remote terminal unit 22 is depicted in communication with a first intelligent electronic cryptographic module 26. First intelligent electronic cryptographic module 26 is shown having a first cryptographic chip 58a for selectively encrypting responses and information transmitted to enterprise server 10, and for decrypting encrypted commands and requests for information transmitted by enterprise server 10.

While FIG. 3 depicts first intelligent electronic cryptographic module 26 disposed on first vessel 12, first intelligent electronic cryptographic module 26 can also be remote from first vessel 12, first remote terminal unit 22, or combinations thereof.

In a contemplated embodiment, first intelligent electronic cryptographic module 26 can be integral with first remote terminal unit 22, as a single unit, wherein first intelligent electronic cryptographic module 26 performs the functions of both first intelligent electronic cryptographic module 26 and first remote terminal unit 22 simultaneously.

It is further contemplated that a single intelligent electronic cryptographic module can communicate with multiple remote terminal units and selectively encrypt responses and information transmitted to enterprise server 10 and decrypt commands and requests for information transmitted to any of the remote terminal units.

First intelligent electronic cryptographic module 26 is depicted having a first cryptography chip 58a, for selectively encrypting information and responses from first remote terminal unit 22 and for decrypting encrypted commands and requests for information from enterprise server 10.

A first broadcast device 16 is shown disposed on first vessel 12 in communication with first intelligent electronic cryptographic module 26. While FIG. 3 depicts first broadcast device 16 on first vessel 12, first broadcast device 16 can also be remote from first vessel 12, first remote terminal unit 22, first intelligent electronic cryptographic module 26, or combinations thereof and in communication with one or more components of the present system using one or more networks, which can include use of network 20.

The first broadcast device 16 is contemplated to enable first remote terminal unit 22 to communicate directly with enterprise server 10 for transmitting information and responses to commands. Transmissions to and from enterprise server 10 are contemplated to utilize communication software 38. The first broadcast device 16 can also receive information and responses from submersible vessel remote terminal unit 62 for storing in first memory area 34 or transmitting to enterprise server 10.

FIG. 3 further depicts second vessel 14 as a ship, second vessel 14 can be any type of vehicle, including military vehicles, emergency vehicles, transportation vehicles, floating vessels, airplanes, and other moving vehicles. Second vessel 14 can also be an individual, a piece of equipment or other object, a container, or other similar objects.

Second vessel 14 is shown having a second data broadcast device 18, which can be the same type of device as first data broadcast device 16, or a different type of data broadcast device. Second data broadcast device 18 is shown in communication with network 20, for tracking and determining the location of second vessel 14.

Second data broadcast device 18 is shown in communication with second remote terminal unit 24 disposed on second vessel 14. While second remote terminal unit 24 is shown disposed on second vessel 14, second remote terminal unit 24 could also be remote from second vessel 14 and in communication with second data broadcast device 18 over one or more networks, which can include use of network 20. Second remote terminal unit 24 can simultaneously communicate with any number of data broadcast devices on any number of vessels.

Second remote terminal unit 24 is shown having a remote terminal unit processor 52 in communication with a second memory area 36. Second memory area 36 is depicted having second digital data 32, which can be any type of data, measurement, information, collected by second remote terminal unit 24 or second data broadcast device 18. While second memory area 36 is depicted within second remote terminal unit 24, second memory area 36 can also be remote from second remote terminal unit 24, and in communication with second remote terminal unit 24 using one or more networks, which can include use of network 20.

Second memory area 36 is also shown having generic encapsulation layer and automation software 48, which operates as a hardware interface layer containing communication programs enabling second remote terminal unit 24 to communicate with enterprise server 10. Programs within the generic encapsulation layer and automation software 48 can include timing programs, communication buffers, input/output scanners, memory management, real time clock, and power management routines.

Second memory area 36 is further shown having analog-to-digital converter 50 stored thereon, for converting measured data and information into selected formats for storage and/or transmission. While analog-to-digital converter 50 is depicted as software stored within second memory area 36, use of analog-to-digital conversion hardware is also contemplated.

Second memory area 36 is also shown having a command register 54, which is contemplated to be in communication remote terminal unit processor 52 for enabling remote terminal unit processor 52 to move digital representations into second memory area 36 when command register 54 contains an enabling communication command.

Second remote terminal unit 24 is shown in communication with a second intelligent electronic cryptographic module 28 via a bidirectional port 56. While second intelligent electronic cryptographic module 28 is shown disposed on second vessel 14, it is contemplated that second intelligent electronic cryptographic module 28 can also be remote from second vessel 14 and in communication with second remote terminal unit 24 using one or more networks, which can include use of network 20.

Second intelligent electronic cryptographic module 28 can also be integral with second remote terminal unit 24, the functions of the second intelligent electronic cryptographic module 28 and the second remote terminal unit 24 can be performed simultaneously, as a single unit.

Second intelligent electronic cryptographic module 28 can also be in communication with any number of remote terminal units for selectively encrypting and decrypting commands, responses, information, and requests for information.

Second intelligent electronic cryptographic module 28 is shown having a second cryptography chip 58b, for selectively encrypting information and responses transmitted by second remote terminal unit 24, and for decrypting encrypted commands and requests for information from enterprise server 10.

A second broadcast device 18 is shown disposed on second vessel 14 in communication with second intelligent electronic cryptographic module 28. While FIG. 3 depicts second broadcast device 18 disposed on second vessel 14, the second broadcast device 18 can also be remote from the second vessel 14, second remote terminal unit 24, second intelligent electronic cryptographic module 28, or combinations thereof and in communication with one or more components of the present system using one or more networks, which can include use of network 20.

Second broadcast device 18 is contemplated to enable second remote terminal unit 24 to communicate directly with enterprise server 10. Transmissions to and from enterprise server 10 are contemplated to utilize communication software 38. Second broadcast device 18 can also receive information and responses from submersible vessel remote terminal unit 62 for storing in second memory area 36 or transmitting to enterprise server 10.

FIG. 3 further depicts submersible vessel 60, which can be any kind of submersible vehicle, housing, equipment, or container able to contain a remote terminal unit and protect the remote terminal unit from an oceanic bottom environment. Submersible vessel 60 can optionally include one or more data broadcast devices for tracking and determining the location of submersible vessel 60.

Submersible vessel 60 is shown having a submersible vessel remote terminal unit 62 disposed therein. Submersible vessel remote terminal unit 62 can include any combination of processors, memory areas, analog-to-digital converters, generic encapsulation layer and automation software, ports, and cryptographic hardware, as described previously.

A submersible vessel broadcast device 64 is shown disposed on submersible vessel 60, for enabling submersible vessel remote terminal unit 62 to transmit information and responses to enterprise server 10 and receive commands and requests for information from enterprise server 10.

Submersible vessel remote terminal unit 62 is shown in communication with a submersible vessel intelligent electronic cryptographic module 66. Submersible vessel intelligent electronic cryptographic module 66 is depicted remote from submersible vessel 60, however submersible vessel intelligent electronic cryptographic module 66 can also be disposed within submersible vessel 60, or integral with submersible vessel remote terminal unit 62, as described previously.

Submersible vessel intelligent electronic cryptographic module 66 is shown having a fourth cryptography chip 58*d*, for selectively encrypting information and responses transmitted from submersible vessel remote terminal unit 62 and decrypting encrypted commands and requests for information transmitted by enterprise server 10.

It is contemplated that submersible vessel broadcast device 64 enables submersible vessel remote terminal unit 62 to communicate directly with enterprise server 10. Submersible vessel broadcast device 64 can also enable submersible vessel remote terminal unit 62 to communicate with first remote terminal unit 22 and the second remote terminal unit 24, or combinations thereof, which can store information or responses transmitted by submersible vessel remote terminal unit 22, transmit the information or responses to enterprise server 10, or combinations thereof.

FIG. 3 further depicts the enterprise server 10 with a protocol module 92, a telemetry interface 95, and authenticating computer instructions 71. The second remote terminal unit 24 is depicted with verifying computer instructions 75. Though the verifying computer instructions 75 are depicted on remote terminal unit 24, it is contemplated that the verifying computer instructions 75 can be incorporated with any remote terminal unit.

Figure 4:
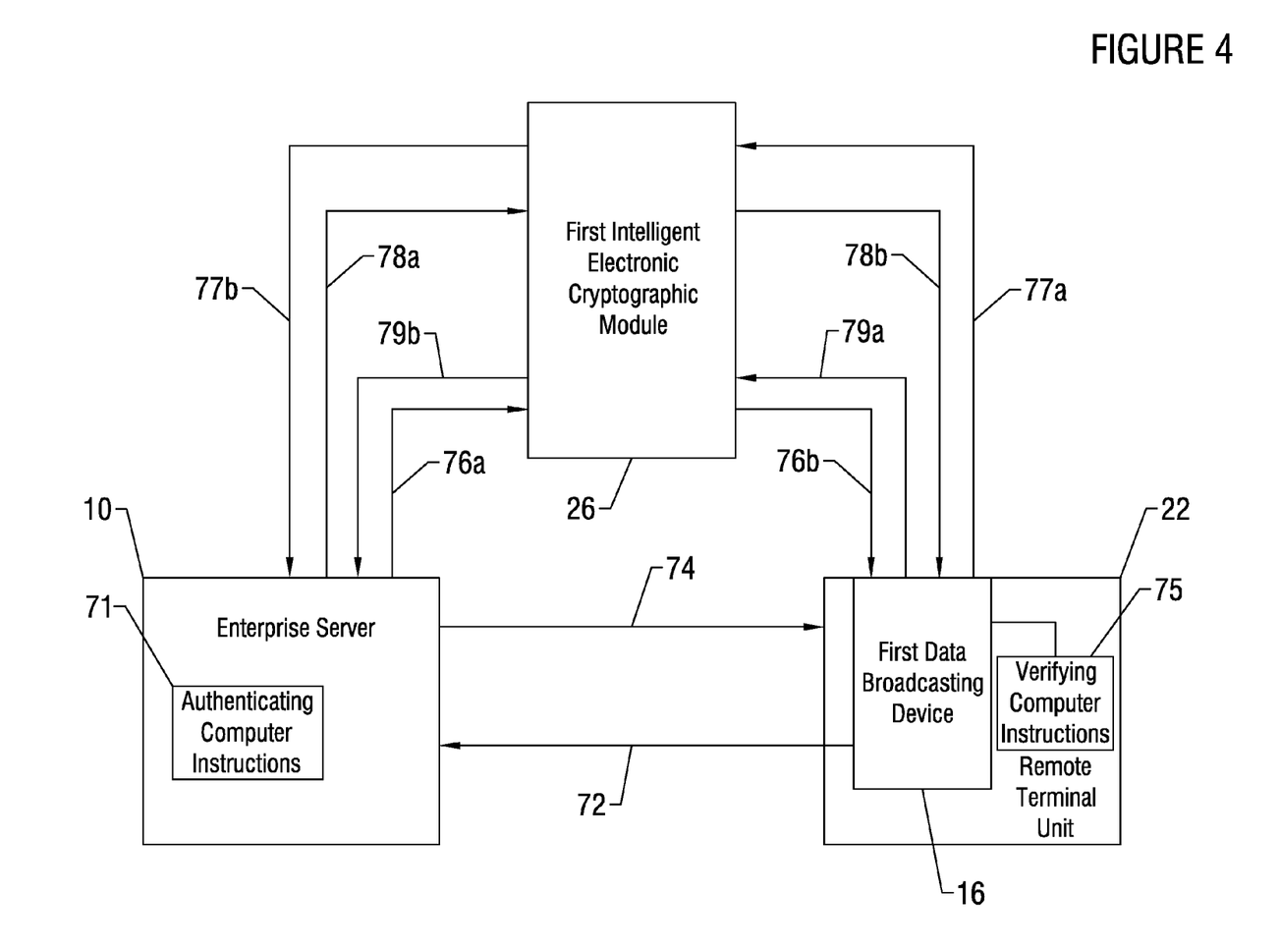
FIG. 4 depicts an embodiment of how an enterprise server communicates with a remote terminal unit.

FIG. 4, depicts an embodiment of the first remote terminal unit 22 communicating with the enterprise server 10. In this embodiment, the first data broadcast device 16 is integrated with the first remote terminal unit 22.

In communication path 72 the first data broadcast device 16 is sending digital data to the enterprise server 10, directly from the first remote terminal unit 22 to the enterprise server 10, without the use of the first intelligent electronic cryptographic module 26. The data sent through communication path 72 can be uploaded by the enterprise server 10. The communication software would check for changes in measurable conditions.

The at least one enterprise server 10 can have authenticating computer instructions 71 for authenticating an identification of each remote terminal unit prior to receiving digital data from the at least one remote terminal unit. For example before the enterprise server 10 receives digital data through communication path 72, the enterprise server 10 would use authenticating computer instructions 71 for authenticating that the first remote terminal unit 22 is authorized to communicate with the enterprise server 10.

In communication path 74 the enterprise server 10 is communicating with the first remote terminal 22. The enterprise server 10 could be requesting digital data from the first remote terminal unit 22, configuring the first remote terminal unit 22, reconfiguring the first remote terminal unit 22, issuing a command to the first remote terminal unit 22 to temporally go offline, or combinations thereof. The communication sent through the communication path 74 bypasses the first intelligent electronic cryptographic module 26.

The remote terminal units can have verifying computer instructions 75 for verifying an identification of the enterprise server 10 prior to transmitting digital data. For example, each remote terminal unit in communication with the enterprise server 10 would have verifying computer instructions 75 to verify that the enterprise server 10 is authorized to communicate with the first remote terminal unit 22, before the first remote terminal unit 22 would respond to the enterprise server's 10 request for digital data, command, or transmission of digital data.

The authenticating computer instructions 71 stored on the enterprise server 10 can be adapted to simultaneously authenticate the first remote terminal unit 22 while the verifying computer instructions 75 verifies the identity of the enterprise server 10.

Additional, the authenticating computer instructions 71 can simultaneously authenticate the identity of a plurality of remote terminal units, and the verifying computer instructions 75 can verify the identity of a plurality of enterprise servers simultaneously.

In communication path 76*a* the enterprise server 10 is sending a request to the first remote terminal unit 22. The communication sent on path 76*a* is selectively encrypted by the first intelligent electronic cryptographic module 26. The communication then travels from the first intelligent electronic cryptographic module 26 to the first remote terminal unit 22. The first remote terminal unit 22 would receive encrypted communication form communication path 76*b*.

The first remote terminal unit 22 can also send data to the enterprise server 10 along communication path 79*a*. The data sent along communication path 79*a* would be selectively encrypted by the first intelligent electronic cryptographic module 26. After selective encryption the data would travel along communication path 79*b* to the enterprise server 10. Once at the enterprise server 10, the enterprise server 10 would act upon the data.

Communication path 78*a* represents the communication path for digital data or request sent from the enterprise server 10 to the first intelligent electronic cryptographic module 26. The digital data or request from the enterprise server 10 can go through the first intelligent electronic cryptographic module 26. Along this path the first intelligent electronic cryptographic module 26, allows the digital data or request to pass through without encryption. The first remote terminal unit 22 would then receive the data or request unencrypted from communication path 78b.

Communication path 77a represents the first data broadcast device 16 sending data or digital data to the enterprise server 10 through the first intelligent electronic cryptographic module 26. The data would pass through the first intelligent electronic cryptographic module 26 with out being encrypted and would be sent to the enterprise server 10 along communication path 77b as unencrypted digital data.

It is contemplated that other communication paths could be created and that multiple intelligent electronic cryptographic modules could be used. For example the first data broadcast device 16 could send digital data or receive encrypted digital data from a secondary intelligent electronic cryptographic module, and then transfer the data to the enterprise server 10 through the first intelligent electronic cryptographic module 26. And the first intelligent electronic cryptographic module 26 could decrypt the data and send unencrypted data to the enterprise server 10.

Further, the enterprise server 10 could be in communication with several data broadcast devices and electronic cryptographic modules. In the alternative, the enterprise server could be in communication with only one electronic cryptographic module, and the intelligent electronic cryptographic module could be in communication with several data broadcast devices.

Figure 5:
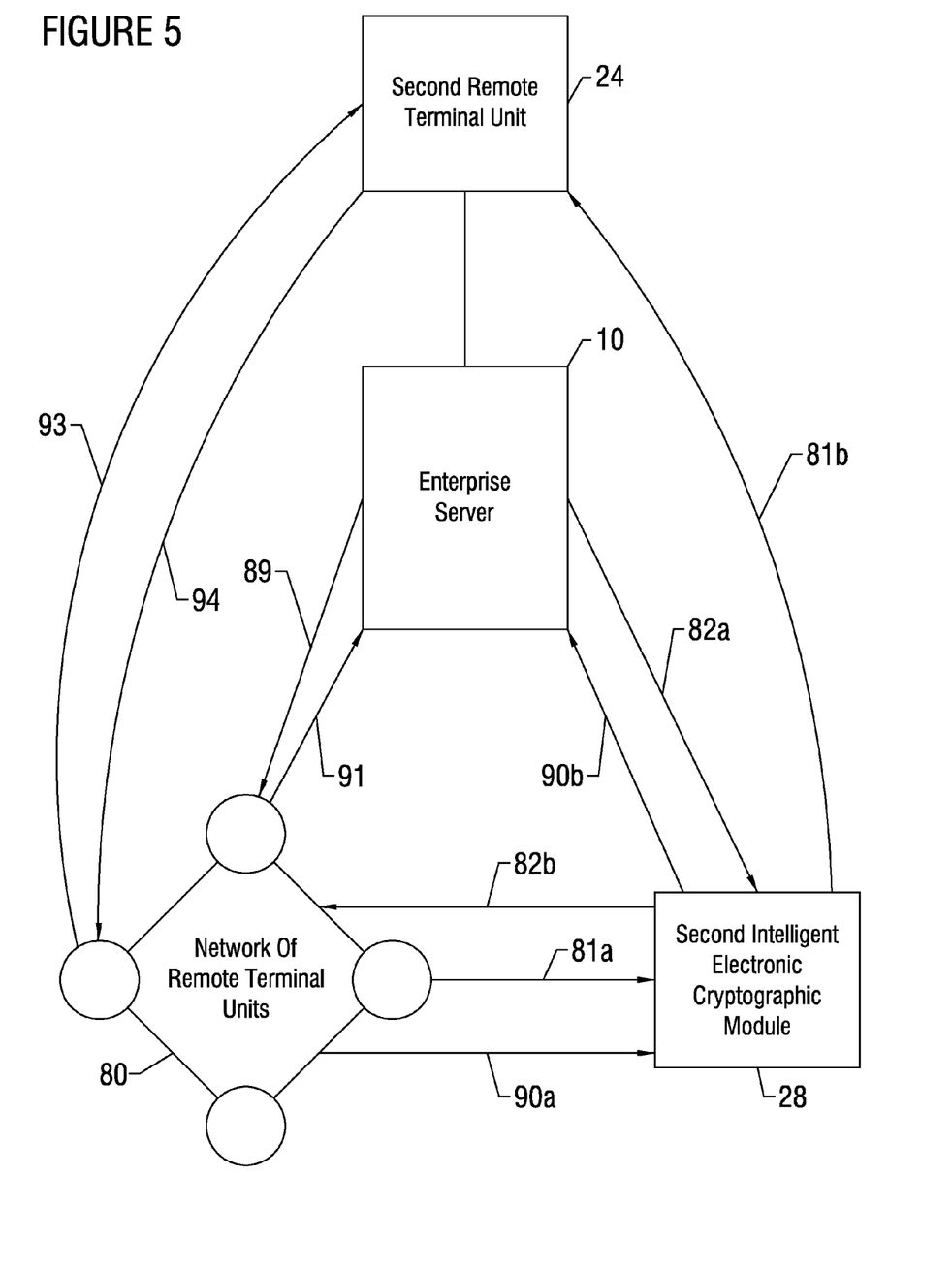
FIG. 5 depicts a remote terminal unit and a network remote terminal units in communication with an enterprise server.

FIG. 5 represents the enterprise server in communication with the second remote terminal unit 24. Further the second remote terminal unit 24 and the enterprise server 10 are in communication with a second intelligent electronic cryptographic module 28 and a network of remote terminal units 80. The network of remote terminal units 80 can be a plurality of remote terminal units linked together to perform a common task.

The enterprise server 10 can send digital data, a request for digital data, or a command along path 82a through the second intelligent electronic cryptographic module 28. The digital data would be selectively encrypted or unencrypted then sent to the network of remote terminal units 80 along path 82b.

The network of remote terminal units 80 can also send digital data, a request for digital data, or a command to the second remote terminal unit 24. The communication can travel along communication path 81a to the second intelligent electronic cryptographic module 28. Then the second intelligent electronic cryptographic module 28 would selectively encrypt or un-encrypt the communication and send the communication along communication path 81b to the second remote terminal unit 24.

The second remote terminal unit 24 could also speak directly with the network of remote terminal units 80 without the use of the second intelligent electronic cryptographic module 28.

The network of remote terminal units 80 can also speak to the enterprise server 10 along communication path 90a and 90b. The communication path 90a is from the network of remote terminal units 80 to the second intelligent electronic cryptographic module 28. The communication path 90b is from the second intelligent electronic cryptographic module 28 to the enterprise server 10.

The enterprise server 10 can send a communication directly to the network of remote terminal units 80 along communication path 89. The network of remote terminal units 80 can send communication directly to enterprise server 10 along communication path 91.

The network of remote terminal units 80 can communicate directly with the second remote terminal unit 24 using communication path 93. The second remote terminal unit 24 can communicate with the network of remote terminal units 80 along communication path 94.

Figure 6:
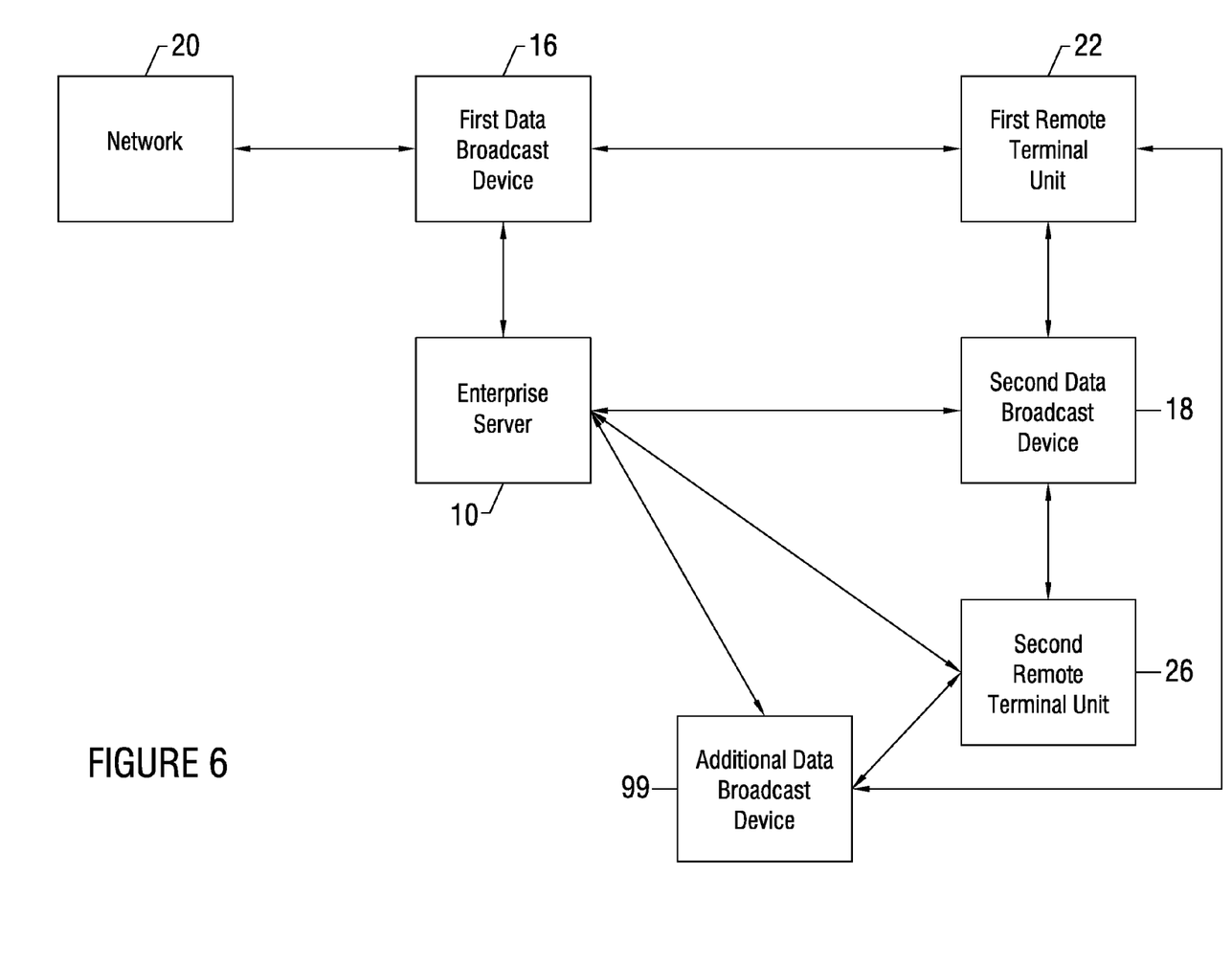
FIG. 6 depicts an alternative embodiment of a system usable with the embodiments of the method.

FIG. 6 depicts another embodiment of the system. In the depicted embodiment the first data broadcast device 16 receives a communication from the network 20. The first data broadcast device 16 sends the digital data to the first remote terminal unit 22. The first data broadcast device 16 is also in two way communication with the enterprise server 10. The first remote terminal unit 22 is in communication with the enterprise server 10 using the second data broadcast device 18. The communication paths can be the same as described in FIGS. 2 and 3.

The second data broadcast device 18 is in simultaneous communication with a second remote terminal unit 26. The second remote terminal unit 26 has an additional data broadcast device 99 in communication with the enterprise server 10 and the first remote terminal unit 22.

It would also be possible for the network 20 to be in two way communication directly with any of the remote terminal units and/or the enterprise server 10. Additionally, the first data broadcast device 16 can be in direct simultaneous communication with each of the remote terminal units and the enterprise server 10.

While these embodiments have been described with emphasis on the embodiments, it should be understood that within the scope of the appended claims, the embodiments might be practiced other than as specifically described herein.

What is claimed is:

1. A method for receiving information on measurable conditions and for controlling at least one remote terminal unit using an enterprise server, wherein the method comprises the steps of:
   a. adapting at least one enterprise server to simultaneously handle multiple types of telemetry and multiple different protocols associated with a remote terminal unit on a vessel over a network;
   b. using computer instructions stored in a memory and cryptographic modules to selectively encrypt communication between the enterprise server and the remote terminal unit by performing an action selected from the group consisting of:
      i. encrypting before transmission;
      ii. passing a transmission through the cryptographic modules and encrypting during transmission through the cryptographic modules; wherein each cryptographic module has a cryptography chip; and
      iii. combinations thereof,
   c. using computer instructions on each enterprise server to authenticate an identification of the remote terminal unit;
   d. using computer instructions on the remote terminal unit to verify an identification of the at least one enterprise server;
   e. collecting data on the measurable conditions by the remote terminal unit and performing an action selected from the group consisting of:
      i. storing the collected data and then transmitting the collected data to the enterprise server;
      ii. storing the collected data and then transmitting the collected data to second remote terminal unit that transmits the collected data to the at least one enterprise server;

iii. streaming the collected data to the enterprise server;
iv. streaming the collected data to at least one a second remote terminal unit that transmits the collected data to the at least one enterprise server; and
v. combinations thereof;
f. automatically initiating an alarm by the remote terminal unit when the collected data is outside a preset limit; and
g. while communicating using selective encryption between the at least one remote terminal unit and the enterprise server, using computer instructions stored on the enterprise server to:
  i. online configure the at least one remote terminal unit, while simultaneously operating the at least one remote terminal unit; or
  ii. online reconfigure the at least one remote terminal unit, while simultaneously operating the at least one remote terminal unit.

2. The method of claim 1, wherein the measurable conditions comprise: changes in pressure, changes in location of the at least one vessel, changes in location of the at least one vessel relative to a predefined position, changes in temperature, changes in location of the at least one vessel relative to an identified secondary location, changes in altitude, or combinations thereof.

3. The method of claim 1, wherein the at least one vessel is a member of the group consisting of: a semi-submersible platform, a submersible vessel, a floating vessel, an armored vehicle, a moving vehicle, a deep draft cassion vessel, a ship, a truck, an automobile, a train, a bus, a plane, an individual human, an animal, a container on a vessel, a fuel tank, a piece of equipment, and combinations thereof.

4. The method of claim 1, wherein the remote terminal unit is selected form the group consisting of: a sensor with a transmitter, a radio frequency identification tag with an activator and a receiver, a bar code with a bar code reader, a status switch, a global positioning system receiver and transmitter, a portable data acquisition system, a data acquisition recording device, a vibration monitoring device, a video monitoring device, and combinations thereof.

5. The method of claim 4, further comprising the step of communicating the terminal unit with a data broadcast device to collect data from a point remote from the remote terminal unit, wherein the act of collecting and storing data is performed simultaneous with the step of communicating between the at least one remote terminal unit and the data broadcast device.

6. The method of claim 1, further comprising establishing communication with a member of the group: a second vessel, a second remote terminal unit, or combinations thereof, while the enterprise server continuously communicates with the vessel.

7. The method of claim 6, further comprising removing a member of the group: a second vessel, a second remote terminal unit, or combinations thereof, from communication with the enterprise server while the at least one enterprise server continuously communicates with the vessel.

8. The method of claim 1, further comprising establishing communication with a member of the group: a second vessel, a second remote terminal unit, or combinations thereof, while the enterprise server continuously communicates with the at least one remote terminal unit.

9. The method of claim 8, further comprising removing a member of the group: a second vessel, a second remote terminal unit, or combinations thereof, from communication with the enterprise server while the enterprise server continuously communicates with the remote terminal unit.

10. The method of claim 1, wherein the at least one remote terminal unit directly communicates with the enterprise server using a member selected from the group consisting of: a plain old telephone system, a radio frequency system, a cellular network system, a fiber optic system, an infra-red system, a satellite system, an Ethernet system, or combinations thereof.

11. The method of claim 1, further comprising simultaneously sending information to the remote terminal unit while receiving data from the remote terminal unit.

12. The method of claim 1, further comprising permitting the remote terminal unit on the vessel to communicate with a second remote terminal unit disposed on a second vessel, wherein the remote terminal unit and the second remote terminal unit are simultaneously communicating directly with the enterprise server.

13. The method of claim 12, wherein the vessel is under water and the second vessel is above water.

14. The method of claim 12, further comprising simultaneously transmitting the data from each of the remote terminal units to the enterprise server, and simultaneously detecting changes in the measurable conditions from each of the remote terminal units.

15. The method of claim 1, further comprising the step of using the enterprise server to trigger an action in response to an alarm condition.

16. The method of claim 1, further comprising the step of comparing the collected data to a set of preset limits using the remote terminal unit, and when the collected data exceeds the set of preset limits, transmitting the collected data to the enterprise server.

17. The method of claim 1, further comprising the step of comparing the collected data to a set of preset limits using the enterprise server.

18. The method of claim 1, wherein the steps of authenticating the identification of the remote terminal unit by the enterprise server and verifying the identification of the at least one enterprise server by the remote terminal unit are performed simultaneously.

19. The method of claim 1, wherein the remote terminal unit digitizes the collected data prior to storing the data or streaming the data to the enterprise server.

* * * * *